(12) United States Patent
Tabata

(10) Patent No.: US 6,326,602 B1
(45) Date of Patent: Dec. 4, 2001

(54) IMAGE READING APPARATUS HAVING LIGHT SOURCE ELECTRICALLY AND DIRECTLY CONNECTED TO IMAGE SENSOR BOARD

(75) Inventor: Masami Tabata, Isehara (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/413,023

(22) Filed: Oct. 6, 1999

Related U.S. Application Data

(62) Division of application No. 08/795,636, filed on Feb. 6, 1997, now Pat. No. 6,002,494.

(30) Foreign Application Priority Data

| Feb. 9, 1996 | (JP) | ........................................ 8-24341 |
| Jan. 22, 1997 | (JP) | ........................................ 9-9384 |

(51) Int. Cl.[7] .................................................. H04N 1/04
(52) U.S. Cl. ...................... 250/208.1; 358/475; 358/483
(58) Field of Search ........................ 250/208.1, 234–236; 358/475

(56) References Cited

U.S. PATENT DOCUMENTS

| 4,996,606 | 2/1991 | Kawai et al. .................... 358/475 |
| 5,019,897 | 5/1991 | Shirata et al. .................... 358/509 |
| 5,270,840 | 12/1993 | Ogata et al. ..................... 482/482 |
| 5,331,433 | 7/1994 | Sato ............................... 358/483 |
| 5,418,384 | 5/1995 | Yamana et al. .................... 257/88 |
| 5,434,682 | 7/1995 | Imamura et al. .................. 358/483 |
| 5,477,329 | 12/1995 | Imamura et al. .................. 358/482 |
| 5,579,114 | 11/1996 | Imamura et al. .................. 358/484 |
| 5,780,840 | 7/1998 | Lee et al. ........................ 358/482 |
| 6,002,494 | * 12/1999 | Tabata ............................ 358/475 |

FOREIGN PATENT DOCUMENTS

| A-05-130329 | 5/1993 | (JP) . |
| A-06-3527 | 1/1994 | (JP) . |
| A-07-170373 | 7/1995 | (JP) . |
| A-07-193675 | 7/1995 | (JP) . |
| A-08-163320 | 6/1996 | (JP) . |

* cited by examiner

*Primary Examiner*—Stephone B. Allen
(74) *Attorney, Agent, or Firm*—Fitzpatrick, Cella, Harper & Scinto

(57) ABSTRACT

An image reading apparatus includes a sensor IC having a group of photoelectric conversion devices which are linearly aligned, a sensor board on which the sensor IC is mounted, a lens for forming light information into an image on the sensor IC, a light source having electrical connection lines, an illumination unit consisting of a light guide for guiding light from the light source and outputting the light in a desired direction, and a frame for holding the respective members. The electrical connection lines of the light source are directly connected to the sensor board. Connector cables for the light source can be omitted, and the image sensor and the external system can be electrically connected through one connector. By simplifying the electrical connection, the influence of noise can be minimized.

184 Claims, 8 Drawing Sheets

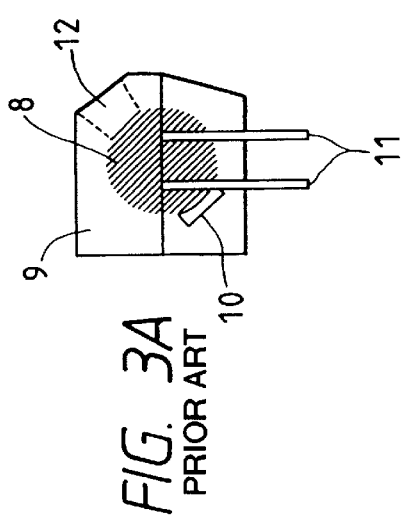
FIG. 3A PRIOR ART
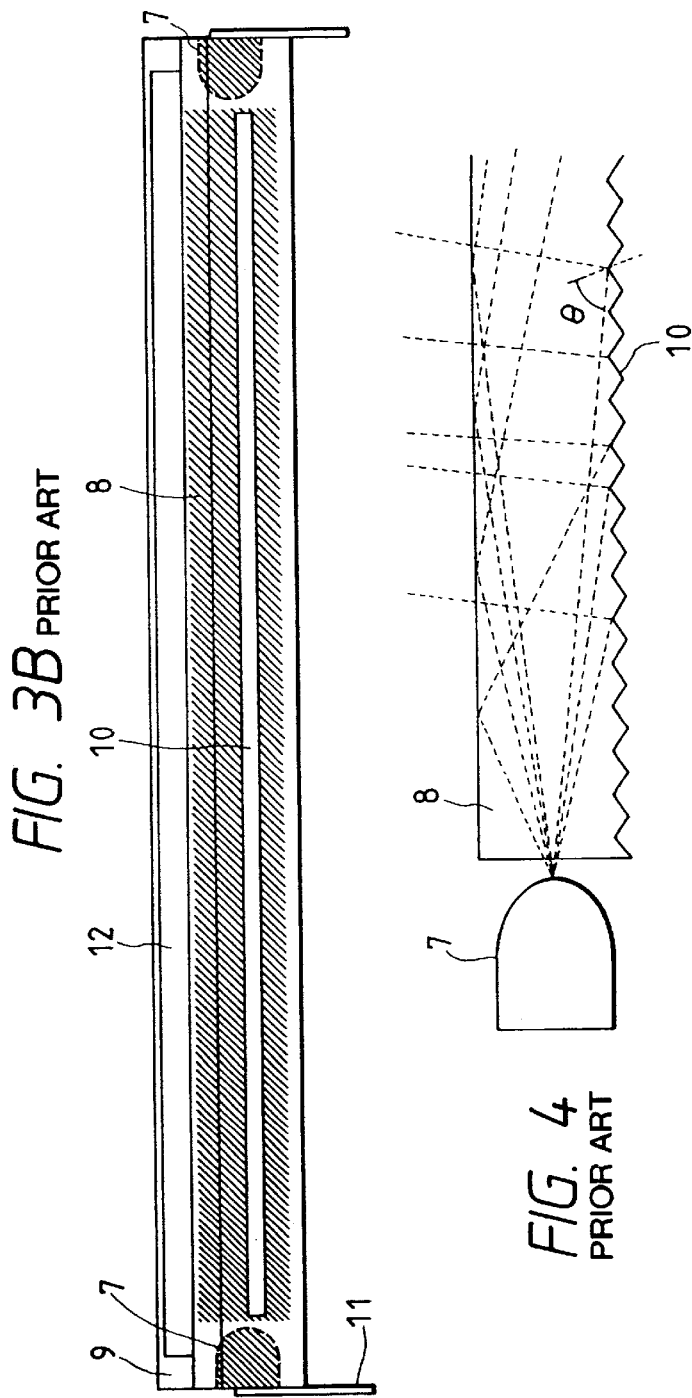
FIG. 3B PRIOR ART
FIG. 4 PRIOR ART

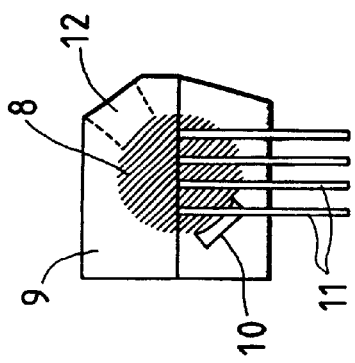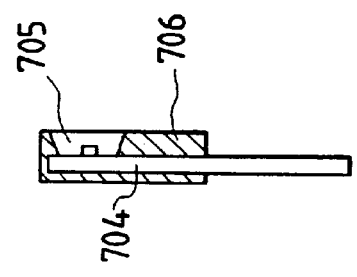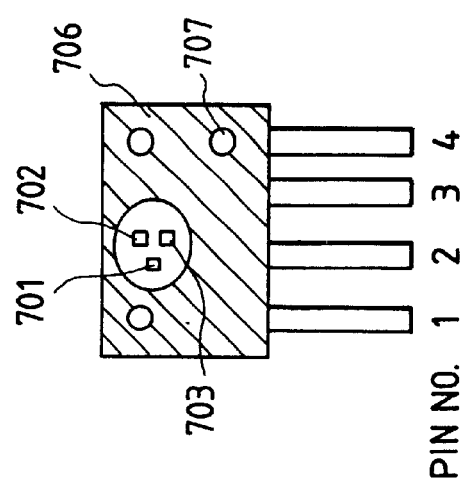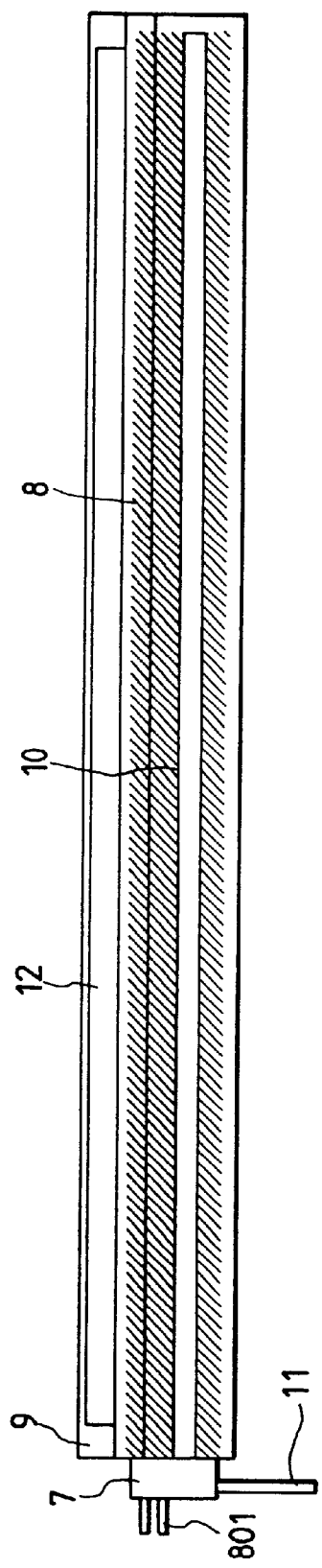

IMAGE READING APPARATUS HAVING LIGHT SOURCE ELECTRICALLY AND DIRECTLY CONNECTED TO IMAGE SENSOR BOARD

This application is a division of application Ser. No. 08/795,636, filed Feb. 6, 1997 now U.S. Pat. No. 6,002,494.

BACKGROUND OF THE INVENTION

1. Field of the Invention

The present invention relates to an image reading apparatus such as a scanner or a facsimile apparatus.

2. Related Background Art

As shown in the sectional view of FIG. 1 and the plan view of FIG. 2, an image sensor used in an original reading apparatus comprises a sensor IC 1, a sensor board 2 on which the sensor IC 1 is mounted, a lens array 3, an illumination unit 4, a cover glass 5, and a frame 6 for positioning/holding these members. The illumination unit 4 comprises lead frame type LEDs 7 serving as light sources, a light guide 8, and a housing 9 for positioning/holding the LEDs 7 and the light guide 8.

FIGS. 3A and 3B are sectional and side views, respectively, showing the detailed structure of the illumination unit 4. Referring to FIGS. 3A and 3B, the illumination unit 4 is constituted by the lead frame type LEDs 7 serving as light sources, the columnar light guide 8 consisting of a transparent member of, e.g., an acrylic resin, and the housing 9 which has a hexagonal section to position/hold the LEDs 7 and the light guide 8.

The LEDs 7 are arranged at the two ends of the light guide 8 such that light beams are incident into the light guide 8. The light guide 8 has a diffusion surface 10. Fine tapered portions are continuously formed on the diffusion surface 10 along the longitudinal direction of the light guide 8, as shown in FIG. 4. A light beam incident on this tapered portion at an incident angle θ of 41° or more (when the light guide 8 consists of an acrylic resin and has a refractive index n of 1.5) satisfies the total reflection angle condition so that the light beam emerges in a desired direction.

The housing 9 for positioning/holding the LEDs 7 and the light guide 8 has, on a surface corresponding to one of the six sides of its hexagonal section, a slit 12 for passing light in the exit direction. To ensure a light amount, the light guide 8 preferably has a white-based color with a high light reflection efficiency. The light guide 8 is formed of, e.g., an ABS resin.

The LEDs 7 are electrically connected to an external system through connector cables 16. Since two LEDs 7 sandwich the light guide 8, two connector cables 16 are necessary. Cables 16 are used to connect leads 11 of the LEDs 7 to driving unit 18, which is used to turn the light source on.

In the above prior art, the LEDs 7 are electrically connected to the external system through the connector cables 16. For this reason, the following problems are posed.

(1) The number of connector cables 16 equal the number of LEDs 7. The cost of the connector cables 16 and an increase in labor for attaching the connector cables 16 to leads 11 of the LEDs 7 result in an increase in cost.

(2) Electrical connection between the image sensor and the external system is complex and therefore easily affected by noise.

(3) A predetermined illuminance on the original read line can hardly be obtained because no luminance adjusting circuit for the LEDs 7 can be inserted between the LEDs 7 and the external system. For this reason, a sensor output ("bright" sensor output) in reading, e.g., a white original largely varies between image sensors as end products.

SUMMARY OF THE INVENTION

It is an object of the present invention to enable high-quality image read processing.

It is another object of the present invention to provide an image reading apparatus having a high mechanical strength.

It is still another object of the present invention to achieve cost and size reduction of an image reading apparatus.

It is a further object of the present invention to minimize variations in read outputs.

In order to achieve the above objects, according to an aspect of the present invention, there is provided an image reading apparatus comprising a light source for irradiating a target object, a sensor IC having a photoelectric conversion device for converting light information from the target object irradiated by the light source into an image signal, a sensor board separated from the light source and mounted with the sensor IC, a frame which incorporates the light source, and fixing means for fixing a lead member from the light source to the sensor board and fixing the sensor board to the frame.

With this arrangement, a sufficient mechanical strength can be ensured while achieving size and cost reduction of the apparatus. In addition, variations in read outputs can be suppressed, so that a high-quality image can be read.

Other features, objects and advantages of the present invention will be apparent from the following specification in conjunction with the accompanying drawings.

BRIEF DESCRIPTION OF THE DRAWINGS

FIGS. 3A and 3B are sectional and side views, respectively, showing an illumination unit of the related art;

FIG. 4 is a view showing the details of the illumination unit of the related art;

FIGS. 14A and 14B are sectional and side views, respectively, showing an illumination section according to the fourth embodiment;

FIGS. 15A and 15B are sectional and side views, respectively, showing an illumination unit according to the fourth embodiment.

DETAILED DESCRIPTION OF THE PREFERRED EMBODIMENTS

Image sensors according to preferred embodiments of the present invention will be described below with reference to the accompanying drawings.

Figure 1:
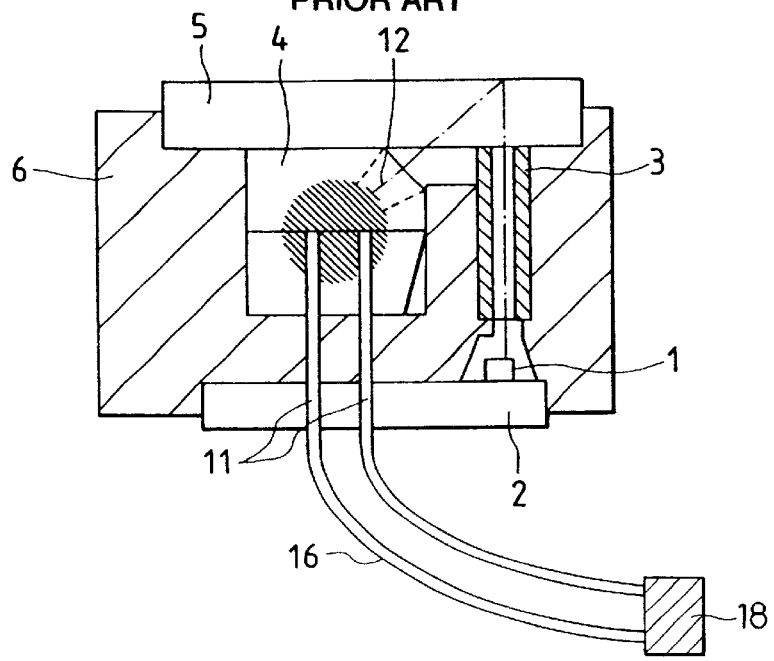
FIG. 1 is a sectional view of an image sensor of a related art.
Figure 2:
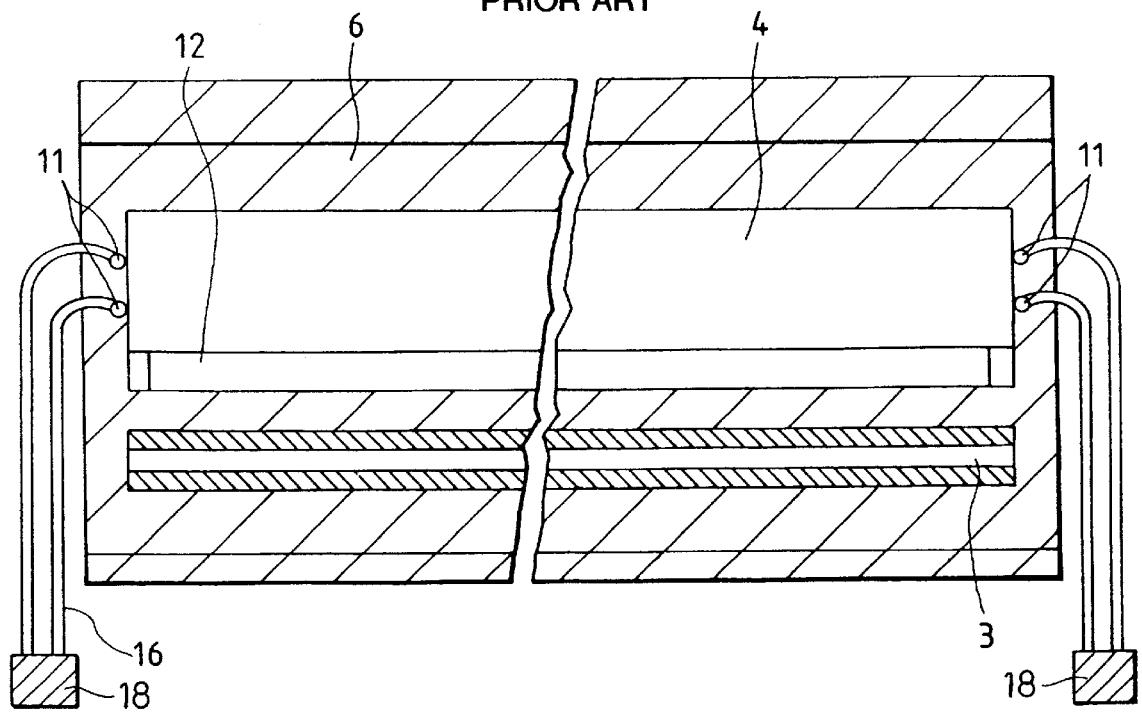
FIG. 2 is a plan view of the image sensor of the related art.
Figure 5:
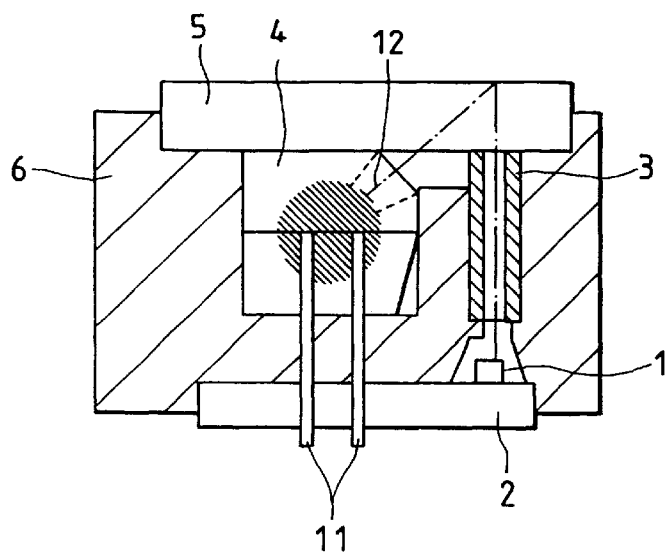
FIG. 5 is a sectional view of an image sensor according to the first embodiment.
Figure 6:
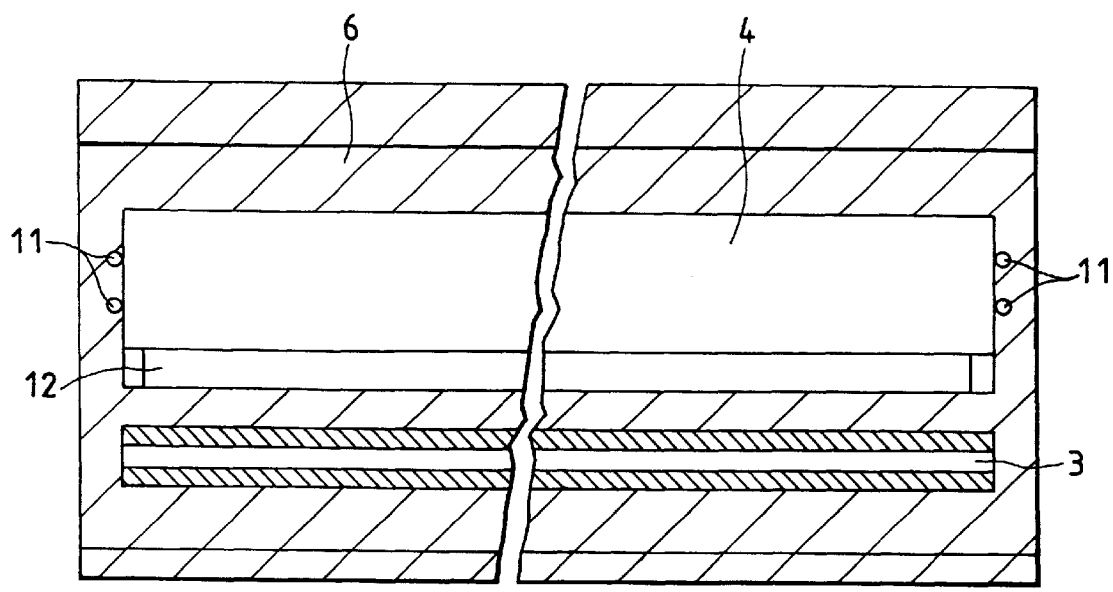
FIG. 6 is a plan view of the image sensor according to the first embodiment.
Figure 7:
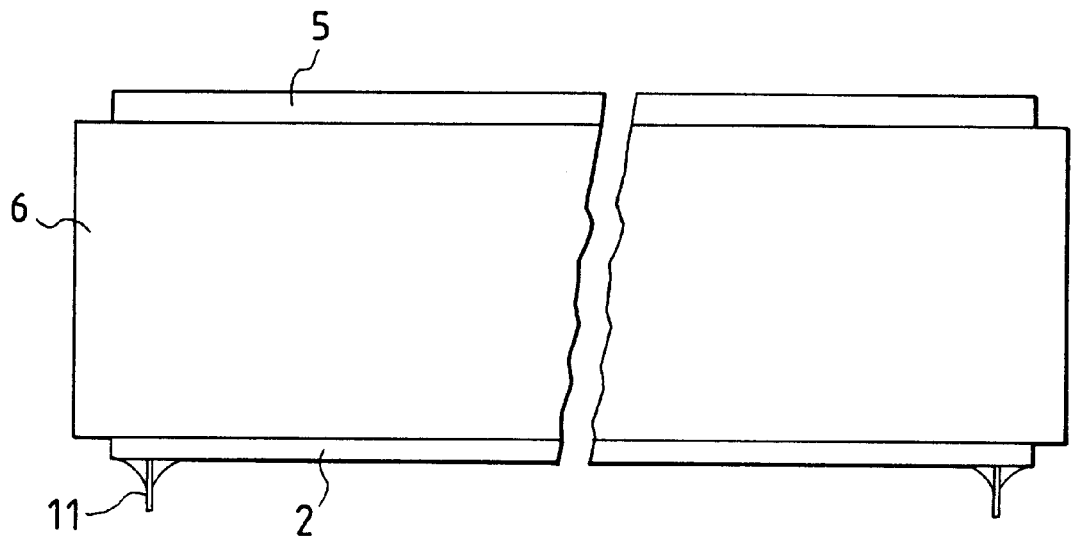
FIG. 7 is a side view of the image sensor according to the first embodiment.

FIGS. 5 to 7 are sectional, plan, and side views, respectively, showing an image sensor according to the first embodiment. This image sensor comprises a sensor array constituted by precisely aligning, on a sensor board 2 consisting of, e.g., a glass epoxy resin, a plurality of sensor ICs 1 having a linear photoelectric conversion device group as a line corresponding to the length of a target read original, a lens array 3, an illumination unit 4, a cover glass 5 consisting of a transparent member for supporting the original, and a frame 6 which is formed of a metal such as aluminum or a resin such as polycarbonate to position/hold these members.

The functions of the respective members will be described. The illumination unit 4 obliquely illuminates an original supported by the cover glass 5, with light at an angle of about 45°. Light information from the original is formed into an image on the sensor IC 1 through the lens array 3. The sensor IC 1 converts the light information into an electric signal and transmits the electric signal to the system.

The illumination unit 4 basically has the same arrangement as that shown in FIG. 4. Two leads 11 extend from LEDs 7 arranged at the two ends of the illumination unit 4.

A method of manufacturing the image sensor of the first embodiment will be described next.

The lens array 3 and the illumination unit 4 are inserted to predetermined positions of the frame 6. When three surfaces of a housing 9, which correspond to three of the six sides of the hexagonal section, are caused to abut against the horizontal and vertical surfaces of the frame 6, the optical axis of the illumination unit 4 can be precisely positioned in the rotational direction.

Next, as shown in FIG. 5, the upper surface of the illumination unit 4 and that of the lens array 3, which are inserted into the frame 6, approximately form a plane together with the cover glass 5 mounting portion of the frame 6. The cover glass 5 is placed on this plane and bonded, with, e.g., an adhesive, to two surfaces of the frame 6, which are set to sandwich the illumination unit 4 and the lens array 3 along the longitudinal direction. The upper surface of the illumination unit 4 approximately parallelly contacts the surface of the cover glass 5 because the upper surface of the illumination unit 4 is a horizontal surface. Therefore, by bonding the frame 6 to cover glass 5, as described above, the illumination unit 4 can be simultaneously firmly fixed.

Figure 8:
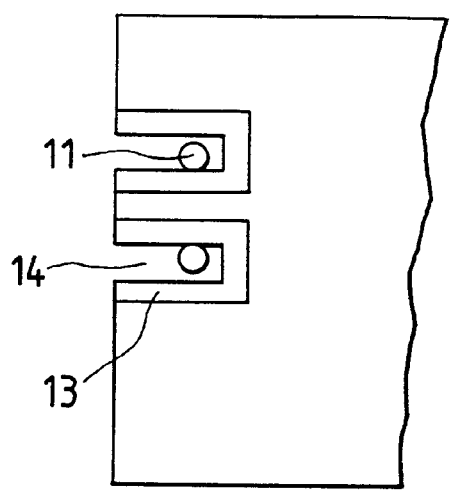
FIG. 8 is a view showing the details of the end portion of a sensor board according to the first embodiment.
Figure 9:
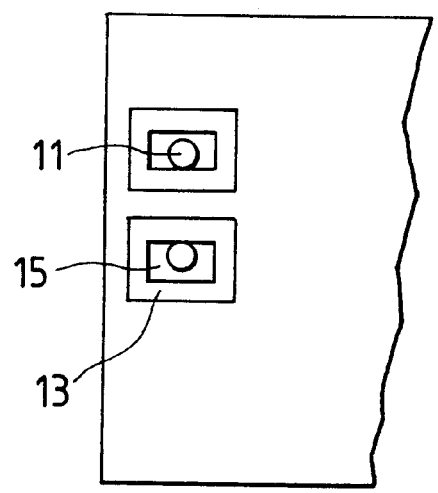
FIG. 9 is a view showing the details of the end portion of the sensor board according to the first embodiment.

The sensor array is inserted into the frame 6. As shown in FIG. 8 or 9, gaps 14 (FIG. 8) or through holes 15 (FIG. 9) are formed in the sensor board 2 of the sensor array at positions or portions corresponding to the leads 11 of the LEDs 7, i.e., at the end portions of the sensor board 2. The leads 11 of the LEDs 7 are bent into an almost L shape and inserted into these gaps 14 or through holes 15. After insertion of the leads 11, the leads 11 are soldered to solder lands 13 formed around the gaps 14 or through holes 15 to fix the sensor board 2 to the frame 6, thereby completing the image sensor.

As shown in FIG. 8 or 9, the gaps 14 or through holes 15 are independently formed in correspondence with the anodes and cathodes of the leads 11 of the LEDs 7. With this arrangement, an electrical short circuit between the leads 11 of the LEDs 7 can be prevented. In addition, when through hole plating is performed for the section of the gap 14 or through hole 15 of the sensor board 2, the soldering strength can be increased.

Figure 10:
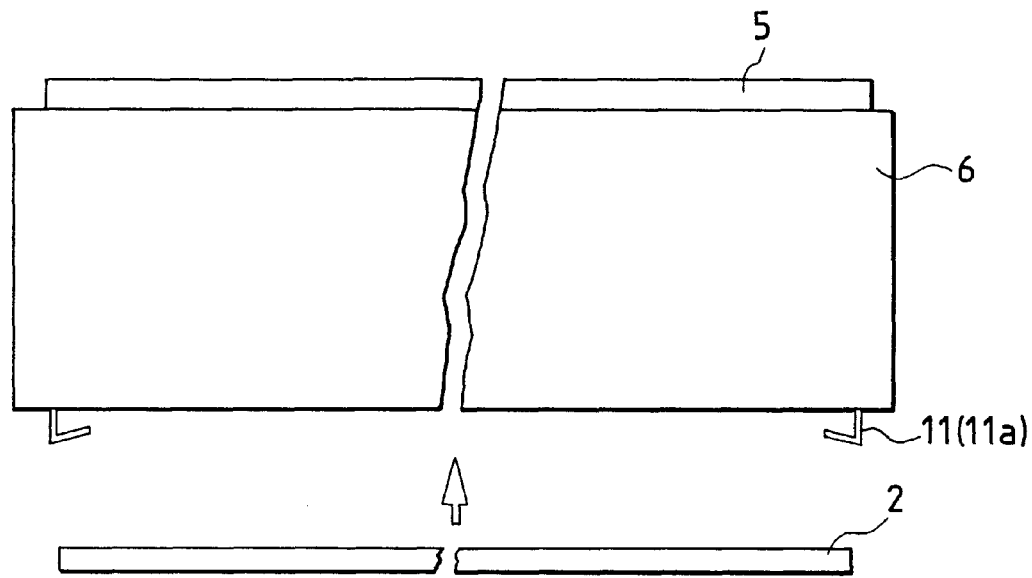
FIG. 10 is a side view of an image sensor according to the second embodiment.
Figure 11:
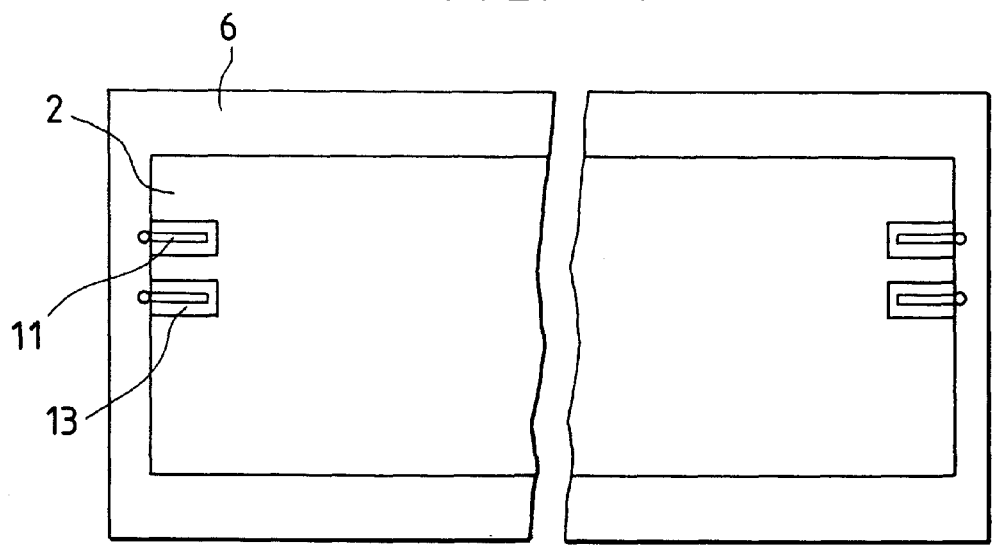
FIG. 11 is a bottom view of the image sensor according to the second embodiment.

FIGS. 10 and 11 show an image sensor according to the second embodiment of the present invention.

In this embodiment, leads 11 of LEDs 7 are bent into an almost U shape such that a second bent portion 11a from the LED 7 forms an angle of 90° or less (FIG. 10). Using the leads 11 of the LEDs 7, a sensor board 2 is inserted into a frame 6 in a snap-fitted manner. With this arrangement, the sensor board 2 can be fixed, and at the same time, electrical contact between the leads 11 of the LEDs 7 and the pads of the sensor board 2 can be obtained.

When the contact portions between the leads 11 of the LEDs 7 and the pads of the sensor board 2 are reinforced by, e.g., forming gaps as described above or soldering, fixing of the sensor board 2 and electrical contact between the leads 11 and the pads of the sensor board 2 can be more reliably achieved.

The third embodiment in which the present invention is applied to an image sensor corresponding to color image read processing will be described below. Generally, to read a color image, light sources of three colors, i.e., red (R), green (G), and blue (B) are used to illuminate an original while sequentially turning on these three color light sources. Light information of three colors, i.e., R, G, and B obtained from the original is formed into an image on a sensor IC through a lens array and converted into an electric signal by the sensor IC, thereby obtaining a color image signal.

Figure 12:
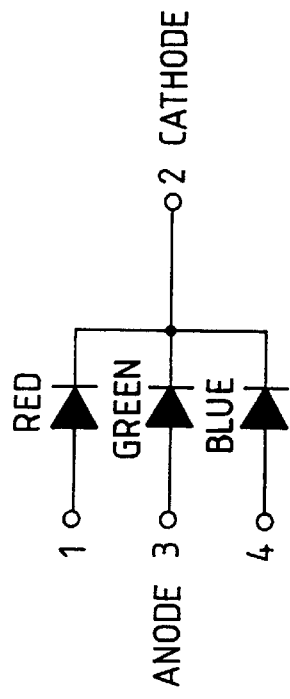
FIG. 12 is an equivalent circuit diagram of an illumination section according to the third embodiment.

FIG. 12 is an equivalent circuit diagram of such a color LED light source. As shown in FIG. 12, the color LED light source is constituted by a common cathode and anodes which are independently arranged in units of LEDs.

Figure 13B:
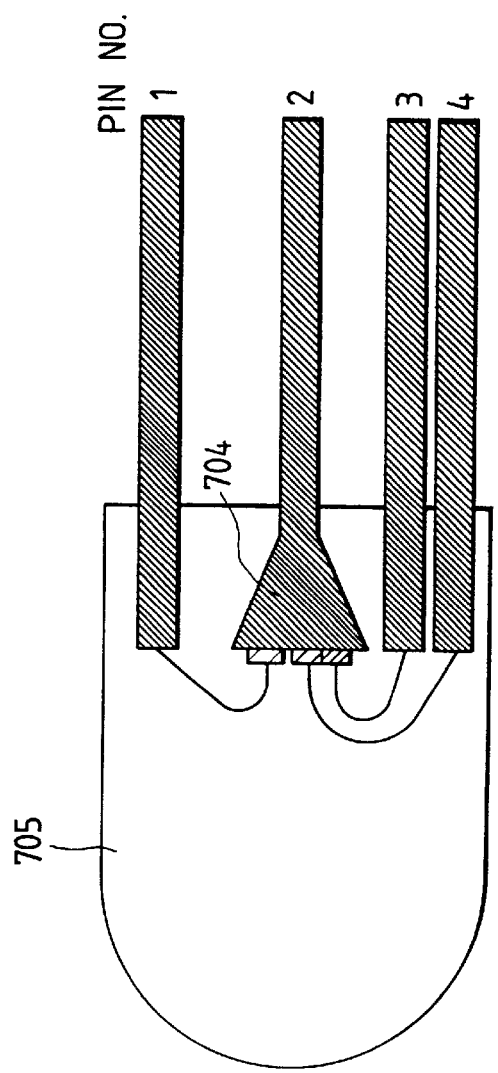
FIGS. 13A and 13B are sectional and side views, respectively, showing the illumination section according to the third embodiment.
Figure 13A:
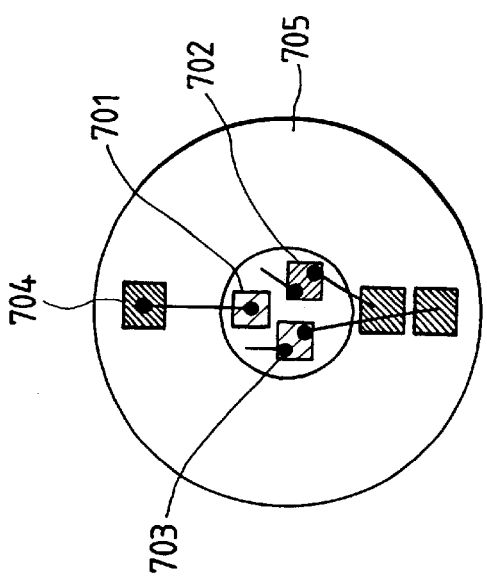

In this embodiment, a light source as shown in FIGS. 13A and 13B is used as a light source for emitting three color, i.e., R, G, and B light components. FIGS. 13A and 13B are sectional and side views, respectively, showing a shell type color LED light source. This LED light source is constituted by an R-LED device 701 for emitting red light, a G-LED device 702 for emitting green light, and a B-LED device 703 for emitting blue light. The cathodes of these three color LED devices are connected to the common base pin of a lead frame 704. The anodes of the LED devices are connected to the pins of the lead frame 704, which are dedicated for the respective colors. This structure is encapsulated with a shell-like transparent resin 705. In this color LED light source, four lead pins 11 of LEDs 7 are directly connected to a sensor board 2 by, e.g., soldering to fix the sensor board 2, as in the above-described monochromatic LED light source. Since the color LED light source has four lead pins, the sensor board 2 can be more reliably positioned and fixed.

As another color LED light source corresponding to color image read processing, a case-molded LED light source as shown in FIGS. 14A and 14B will be described. FIGS. 14A and 14B are plan and sectional views, respectively, showing the case-molded color LED light source. A method of manufacturing this LED light source will be described. A lead frame 704 is inserted into a mold and then injectionmolded, thereby covering the lead frame 704, except an LED device mounting portion, with a white resin 706 having a high light reflection efficiency. Subsequently, the cathodes of three color LED devices, i.e., an R-LED device 701, a G-LED device 702, and a B-LED device 703 are connected to the common base pin of the lead frame 704, and the anodes of the LED devices are connected to the pins of the lead frame 704, which are dedicated for the respective colors. A transparent resin 705 is potted on the three color LED devices, thereby completing the LED light source.

Figure 16A:
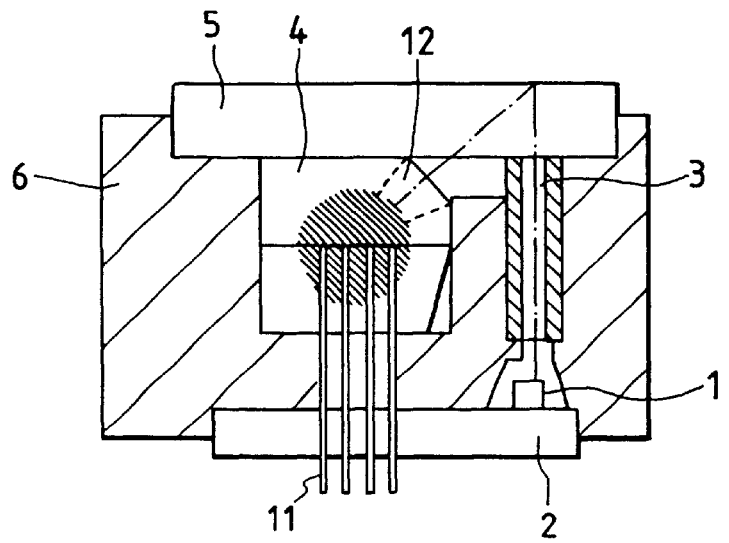
FIGS. 16A and 16B are sectional and side views, respectively, showing an image sensor according to the fourth embodiment.
Figure 16B:
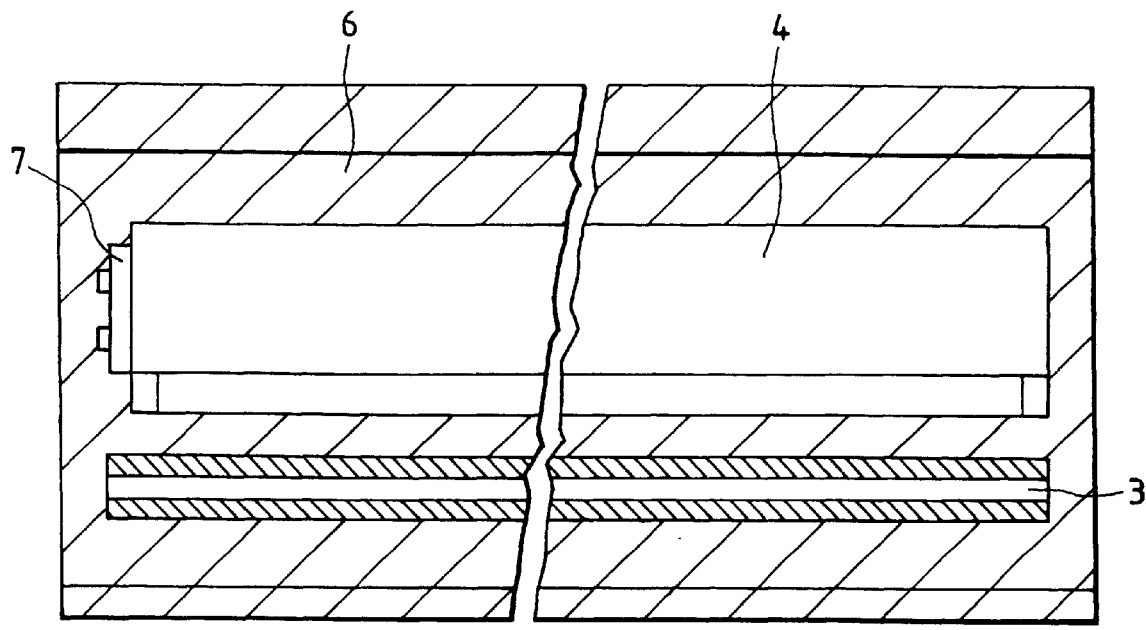

FIGS. 15A and 15B are sectional and side views, respectively, showing an illumination unit 4 to which the case-molded color LED light source is attached. FIGS. 16A and 16B are sectional and side views, respectively, showing an image sensor in which this illumination unit is mounted. The arrangement is basically the same as that using the shell type LED light source. In this case, however, positioning pins 801 are inserted into positioning holes 707 of a light guide 8 and thermally or ultrasonically caulked. With this arrangement, the light source can be properly positioned and fixed. In addition, by directly connecting four lead pins 11 of LEDs 7 to a sensor board 2 by, e.g., soldering, the sensor board 2 can be reliably fixed.

In each of the above embodiments, the present invention can be effectively applied to an image sensor using a reduction lens system.

As has been described above, the following effects can particularly be obtained by directly connecting the electrical connection lines of the light source to the sensor board:

(1) The connector cables for the light source can be omitted, and the image sensor and the external system can be electrically connected through one connector. By simplifying the electrical connection, the influence of noise can be minimized.

(2) A luminance adjusting circuit for the light source is arranged on the sensor board. With this arrangement, variations in sensor outputs ("bright" sensor outputs) in reading a white original can be effectively suppressed.

(3) By bending the electrical connection lines of the light source into an almost U shape, the sensor board can be fixed, and at the same time, electrical contact between the leads of the LEDs and the pads of the sensor board can be obtained.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image reading system comprising:
   (a) a light source connected to an end of a longitudinal light guide for irradiating a target object;
   (b) a sensor IC having a photoelectric conversion device for converting light information from said target object irradiated by said light source into an image signal;
   (c) a sensor board separated from said light source and mounted with said sensor IC;
   (d) a frame which incorporates said light source and said sensor board, wherein a part of said frame is sandwiched by said sensor board and a part of said light guide;
   (e) a fixing member for directly fixing a lead member from said light source to said sensor board; and
   (f) a driving unit adapted to drive said light source to turn on.

2. A system according to claim 1, wherein said fixing member further fixes said sensor board to said frame.

3. A system according to claim 1, further comprising a connection element that electrically connects said lead member and said sensor board.

4. A system according to claim 3, wherein said connection element electrically connects said lead member to a surface of said sensor board other than a surface of said sensor board on which said sensor IC is mounted.

5. A system according to claim 3, wherein said light source is fixed by electrically connecting said lead member and said sensor board by said connection element.

6. A system according to claim 1, wherein said fixing member is constituted by bending said lead member.

7. A system according to claim 1, wherein said sensor board has a gap capable of receiving said lead member, and said lead member and said board are fixed by said fixing member while said lead member is inserted into the gap.

8. A system according to claim 1, wherein said sensor board has a through hole capable of receiving said lead member, and said lead member and said board are fixed by said fixing member while said lead member is inserted into the through hole.

9. A system according to claim 1, further comprising a plurality of lead members extending from said light source, and wherein said fixing member fixes all said lead members to said sensor board.

10. A system according to claim 9, wherein said light source has a plurality of different emission wavelengths.

11. A system according to claim 1, further comprising a lens for forming, on said sensor IC, an image of the light information from said target object irradiated by said light source.

12. A system according to claim 1, wherein said longitudinal light guide is from said light source to irradiate said target object.

13. A system according to claim 12, wherein said light guide is covered by a housing of white color, said housing including an opening to illuminate said target object.

14. A system according to claim 12, further comprising a reflection unit adapted to irradiate the light guided by said light guide in a predetermined direction.

15. A system according to claim 14, wherein said reflection unit has a stepped diffusion surface.

16. A system according to claim 1, wherein said light source includes a LED.

17. A system according to claim 16, wherein said LED and said lead member are electrically connected to each other by a wire.

18. A system according to claim 16, wherein said light source includes a plurality of LEDs each emitting light of a different color.

19. A system according to claim 18, wherein said light source has a plurality of lead members, said plurality of lead members being arranged substantially in parallel to each other.

20. A system according to claim 19, wherein said light source has four lead members.

21. A system according to claim 20, wherein said four lead members include a common cathode and three anodes.

22. A system according to claim 1, wherein said light source has a plurality of lead members, said plurality of lead members being arranged substantially in parallel to each other.

23. A system according to claim 22, wherein said light source has four lead members.

24. A system according to claim 23, wherein said four lead members include a common cathode and three anodes.

25. A system according to claim 1, wherein said fixing member fixes said lead member and said sensor board by solder.

26. A system according to claim 1, wherein said light source is passivated with light transmittable resin.

27. A system according to claim 1, wherein said light source includes a white resin.

28. A system according to claim 1, further comprising a lens array for forming an optical image of said target object onto said sensor IC.

29. A system according to claim 1, wherein said light source is arranged at both end sides of said sensor board.

30. An image reading system comprising:
(a) a light source connected to an end of a longitudinal light guide for irradiating a target object;
(b) a sensor IC having a photoelectric conversion device for converting light information from said target object irradiated by said light source into an image signal;
(c) a sensor board separated from said light source and mounted with said sensor IC;
(d) a frame which incorporates said light source and said sensor board, wherein a part of said frame is sandwiched by said sensor board and a part of said light guide;
(e) a fixing member adapted to directly fix a lead member from said light source to said sensor board;
(f) a driving unit adapted to drive said light source to turn on.

31. A system according to claim 30, wherein said fixing member further fixes said sensor board to said frame.

32. A system according to claim 30, wherein said fixing member is constituted by bending said lead member.

33. A system according to claim 30, wherein said sensor board has a gap capable of receiving said lead member, and said lead member and said board are fixed by said fixing member while said lead member is inserted into the gap.

34. A system according to claim 30, wherein said sensor board has a through hole capable of receiving said lead member, and said lead member and said board are fixed by said fixing member while said lead member is inserted into the through hole.

35. A system according to claim 30, further comprising a plurality of lead members extending from said light source, and wherein said fixing member fixes all said lead members to said sensor board.

36. A system according to claim 35, wherein said light source has a plurality of different emission wavelengths.

37. A system according to claim 30, further comprising a lens for forming, on said sensor IC, an image of the light information from said target object irradiated by said light source.

38. A system according to claim 30, wherein said longitudinal light guide is adapted to guide light from said light source to irradiate said target object.

39. A system according to claim 38, wherein said light guide is covered by a housing of white color, said housing including an opening to illuminate said target object.

40. A system according to claim 38, further comprising a reflection unit adapted to irradiate the light guided by said light guide in a predetermined direction.

41. A system according to claim 40, wherein said reflection unit has a stepped diffusion surface.

42. A system according to claim 30, wherein said light source includes a LED.

43. A system according to claim 42, wherein said LED and said lead member are electrically connected to each other by a wire.

44. A system according to claim 42, wherein said light source includes a plurality of LEDs each emitting light of a different color.

45. A system according to claim 44, wherein said light source has a plurality of lead members, said plurality of lead members being arranged substantially in parallel to each other.

46. A system according to claim 45, wherein said light source has four lead members.

47. A system according to claim 46, wherein said four lead members include a common cathode and three anodes.

48. A system according to claim 30, wherein said light source has a plurality of lead members, said plurality of lead members being arranged substantially in parallel to each other.

49. A system according to claim 48, wherein said light source has four lead members.

50. A system according to claim 49, wherein said four lead members include a common cathode and three anodes.

51. A system according to claim 30, wherein said fixing member fixes said lead member and said sensor board by solder.

52. A system according to claim 30, wherein said light source is passivated with a light transmittable resin.

53. A system according to claim 30, wherein said light source includes a white resin.

54. A system according to claim 30, wherein said connection element electrically connects said lead member to a surface of said sensor board other than a surface of said sensor board on which said sensor IC is mounted.

55. A system according to claim 30, wherein said light source is fixed by electrically connecting said lead member and said sensor board by said connection element.

56. A system according to claim 30, further comprising a lens array for forming an optical image of said target object onto said sensor IC.

57. A system according to claim 30, wherein said light source is arranged at both end sides of said sensor board.

58. An image reading system comprising:
(a) a light source connected to an end of a longitudinal light guide for irradiating a target object;
(b) a sensor IC having a photoelectric conversion device for converting light information from said target object irradiated by said light source into an image signal;
(c) a sensor board separated from said light source and mounted with said sensor IC;
(d) a frame which incorporates said light source and said sensor board, wherein a part of said frame is sandwiched by said sensor board and a part of said light guide;
(e) a fixing member adapted to directly fix a lead member from said light source to said sensor board, said fixing unit is constituted by bending said lead member; and
(f) a driving unit adapted to drive said light source to turn on.

59. A system according to claim 58, wherein said fixing member further fixes said sensor board to said frame.

60. A system according to claim 58, further comprising a connection element that electrically connects said lead member and said sensor board.

61. A system according to claim 60, wherein said connection element electrically connects said lead member to a surface of said sensor board other than a surface of said sensor board on which said sensor IC is mounted.

62. A system according to claim 60, wherein said light source is fixed by electrically connecting said lead member and said sensor board by said connection element.

63. A system according to claim 58, further comprising a plurality of lead members extending from said light source, and wherein said fixing member fixes all said lead members to said sensor board.

64. A system according to claim 63, wherein said light source has a plurality of different emission wavelengths.

65. A system according to claim 58, further comprising a lens for forming, on said sensor IC, an image of the light information from said target object irradiated by said light source.

66. A system according to claim 58, wherein said longitudinal light guide is adapted to guide light from said light source to irradiate said target object.

67. A system according to claim 66, wherein said light guide is covered by a housing of white color, said housing including an opening to illuminate said target object.

68. A system according to claim 66, further comprising a reflection unit adapted to irradiate the light guided by said light guide in a predetermined direction.

69. A system according to claim 68, wherein said reflection unit has a stepped diffusion surface.

70. A system according to claim 58, wherein said light source includes a LED.

71. A system according to claim 70, wherein said LED and said lead member are electrically connected to each other by a wire.

72. A system according to claim 70, wherein said light source includes a plurality of LEDs each emitting light of a different color.

73. A system according to claim 72, wherein said light source has a plurality of lead members, said plurality of lead members being arranged substantially in parallel to each other.

74. A system according to claim 73, wherein said light source has four lead members.

75. A system according to claim 74, wherein said four lead members include a common cathode and three anodes.

76. A system according to claim 58, wherein said light source has a plurality of lead members, said plurality of lead members being arranged substantially in parallel to each other.

77. A system according to claim 76, wherein said light source has four lead members.

78. A system according to claim 77, wherein said four lead members include a common cathode and three anodes.

79. A system according to claim 58, wherein said fixing member fixes said lead member and said sensor board by solder.

80. A system according to claim 58, wherein said light source is passivated with a light transmittable resin.

81. A system according to claim 58, wherein said light source includes a white resin.

82. A system according to claim 58, further comprising a lens array for forming an optical image of said target object onto said sensor IC.

83. A system according to claim 58, wherein said light source is arranged at both end sides of said sensor board.

84. An image reading system comprising:
(a) a light source connected to an end of a longitudinal light guide for irradiating a target object;
(b) a sensor IC having a photoelectric conversion device for converting light information from said target object irradiated by said light source into an image signal;
(c) a sensor board separated from said light source and mounted with said sensor IC;
(d) a frame which incorporates said light source and said sensor board, wherein a part of said frame is sandwiched by said sensor board and a part of said light guide;
(e) a fixing member adapted to directly fix a lead member from said light source to said sensor board, wherein said sensor board has a gap capable of receiving said lead member and said lead member and said board are fixed by said fixing member in a state that said lead member is inserted into the gap; and
(f) a driving unit adapted to drive said light source to turn on.

85. A system according to claim 84, wherein said fixing member further fixes said sensor board to said frame.

86. A system according to claim 84, further comprising a connection element that electrically connects said lead member and said sensor board.

87. A system according to claim 86, wherein said connection element electrically connects said lead member to a surface of said sensor board other than a surface of said sensor board on which said sensor IC is mounted.

88. A system according to claim 86, wherein said light source is fixed by electrically connecting said lead member and said sensor board by said connection element.

89. A system according to claim 84, further comprising a plurality of lead members extending from said light source, and wherein said fixing member fixes all said lead members to said sensor board.

90. A system according to claim 89, wherein said light source has a plurality of different emission wavelengths.

91. A system according to claim 84, further comprising a lens for forming, on said sensor IC, an image of the light information from said target object irradiated by said light source.

92. A system according to claim 84, wherein said longitudinal light guide is adapted to guide light from said light source to irradiate said target object.

93. A system according to claim 92, wherein said light guide is covered by a housing of white color, said housing including an opening to illuminate said target object.

94. A system according to claim 84, further comprising a reflection unit adapted to irradiate the light guided by said light guide in a predetermined direction.

95. A system according to claim 94, wherein said reflection unit has a stepped diffusion surface.

96. A system according to claim 84, wherein said light source includes a LED.

97. A system according to claim 96, wherein said LED and said lead member are electrically connected to each other by a wire.

98. A system according to claim 96, wherein said light source includes a plurality of LEDs each emitting light of a different color.

99. A system according to claim 98, wherein said light source has a plurality of lead members, said plurality of lead members being arranged substantially in parallel to each other.

100. A system according to claim 99, wherein said light source has four lead members.

101. A system according to claim 100, wherein said four lead members include a common cathode and three anodes.

102. A system according to claim 84, wherein said light source has a plurality of lead members, said plurality of lead members being arranged substantially in parallel to each other.

103. A system according to claim 102, wherein said light source has four lead members.

104. A system according to claim 103, wherein said four lead members include a common cathode and three anodes.

105. A system according to claim 84, wherein said fixing member fixes said lead member and said sensor board by solder.

106. A system according to claim 84, wherein said light source is passivated with a light transmittable resin.

107. A system according to claim 84, wherein said light source includes a white resin.

108. A system according to claim 84, further comprising a lens array for forming an optical image of said target object onto said sensor IC.

109. A system according to claim 84, wherein said light source is arranged at both end sides of said sensor board.

110. An image reading system comprising:
(a) a light source connected to an end of a longitudinal light guide for irradiating a target object;
(b) a sensor IC having a photoelectric conversion device for converting light information from said target object irradiated by said light source into an image signal;
(c) a sensor board separated from said light source and mounted with said sensor IC;
(d) a frame which incorporates said light source and said sensor board, wherein a part of said frame is sandwiched by said sensor board and a part of said light guide;
(e) a fixing member adapted to directly fix a lead member from said light source to said sensor board, wherein said sensor board has a through hole capable of receiving said lead member, and said lead member and said board are fixed by said fixing member in a state that said lead member is inserted into the through hole; and
(f) a driving unit adapted to drive said light source to turn on.

111. A system according to claim 110, wherein said fixing member further fixes said sensor board to said frame.

112. A system according to claim 110, further comprising a connection element adapted to electrically connect said lead member and said sensor board.

113. A system according to claim 112, wherein said connection element electrically connects said lead member to a surface of said sensor board other than a surface of said sensor board on which said sensor IC is mounted.

114. A system according to claim 112, wherein said light source is fixed by electrically connecting said lead member and said sensor board by said connection element.

115. A system according to claim 110, further comprising a plurality of lead members extending from said light source, and wherein said fixing member fixes all said lead members to said sensor board.

116. A system according to claim 115, wherein said light source has a plurality of different emission wavelengths.

117. A system according to claim 110, further comprising a lens for forming, on said sensor IC, an image of the light information from said target object irradiated by said light source.

118. A system according to claim 110, wherein said longitudinal light guide is adapted to guide light from said light source to irradiate said target object.

119. A system according to claim 118, wherein said light guide is covered by a housing of white color, said housing including an opening to illuminate said target object.

120. A system according to claim 118, further comprising a reflection unit adapted to irradiate the light guided by said light guide in a predetermined direction.

121. A system according to claim 120, wherein said reflection unit has a stepped diffusion surface.

122. A system according to claim 110, wherein said light source includes a LED.

123. A system according to claim 122, wherein said LED and said lead member are electrically connected to each other by a wire.

124. A system according to claim 122, wherein said light source includes a plurality of LEDs each emitting light of a different color.

125. A system according to claim 124, wherein said light source has a plurality of lead members, said plurality of lead members being arranged substantially in parallel to each other.

126. A system according to claim 125, wherein said light source has four lead members.

127. A system according to claim 126, wherein said four lead members include a common cathode and three anodes.

128. A system according to claim 110, wherein said light source has a plurality of lead members, said plurality of lead members being arranged substantially in parallel to each other.

129. A system according to claim 128, wherein said light source has four lead members.

130. A system according to claim 129, wherein said four lead members include a common cathode and three anodes.

131. A system according to claim 110, wherein said fixing member fixing said lead member and said sensor board by solder.

132. A system according to claim 110, wherein said light source is passivated with a light transmittable resin.

133. A system according to claim 110, wherein said light source includes a white resin.

134. A system according to claim 110, further comprising a lens array for forming an optical image of said target object onto said sensor IC.

135. A system according to claim 110, wherein said light source is arranged at both end sides of said sensor board.

136. An image reading system comprising:
(a) a light source connected to an end of a longitudinal light guide for irradiating a target object;
(b) a sensor IC having a photoelectric conversion device for connecting light information from said target object irradiated by said light source into an image signal;
(c) a sensor board separated from said light source and mounted with said sensor IC;
(d) a frame which incorporates said light source and said sensor board, wherein a part of said frame is sandwiched by said sensor board and a part of said light guide;
(e) a connection element that electrically connects a lead member from said light source and said sensor board; and
(f) a driving unit adapted to drive said light source to turn on.

137. A system according to claim 136, wherein said light source has a plurality of different emission wavelengths.

138. A system according to claim 136, further comprising a lens for forming, on said sensor IC, an image of the light information from said target object irradiated by said light source.

139. A system according to claim 136, further comprising a light guide adapted to guide light from said light source to irradiate said target object.

140. A system according to claim 139, wherein said light guide is covered by a housing of white color, said housing including an opening to illuminate said target object.

141. A system according to claim 133, further comprising a reflection unit adapted to irradiate the light guided by said light guide in a predetermined direction.

142. A system according to claim 141, wherein said reflection unit has a stepped diffusion surface.

143. A system according to claim 136, wherein said light source includes a LED.

144. A system according to claim 143, wherein said LED and said lead member are electrically connected to each other by a wire.

145. A system according to claim 143, wherein said light source includes a plurality of LEDs each emitting light of a different color.

146. A system according to claim 145, wherein said light source has a plurality of lead members, said plurality of lead members being arranged substantially in parallel to each other.

147. A system according to claim 146, wherein said light source has four lead members.

148. A system according to claim 147, wherein said four lead members include a common cathode and three anodes.

149. A system according to claim 136, wherein said light source has a plurality of lead members, said plurality of lead members being arranged substantially in parallel to each other.

150. A system according to claim 149, wherein said light source has four lead members.

151. A system according to claim 150, wherein said four lead members include a common cathode and three anodes.

152. A system according to claim 136, wherein said connection element is adapted to fix said lead member and said sensor board by solder.

153. A system according to claim 136, wherein said light source is passivated with a light transmittable resin.

154. A system according to claim 136, wherein said light source includes a white resin.

155. A system according to claim 136, wherein said connection element electrically connects said lead member to a surface of said sensor board other than a surface of said sensor board on which said sensor IC is mounted.

156. A system according to claim 136, wherein said light source is fixed by electrically connecting said lead member and said sensor board by said connection member.

157. A system according to claim 136, further comprising a lens array for forming an optical image of said target object onto said sensor IC.

158. A system according to claim 136, wherein said light source is arranged at both end sides of said sensor board.

159. An image reading system comprising:
(a) a light guiding light source adapted to guide light emitted from three LEDs arranged on an end portion of said light guiding light source and illuminating an object along a longitudinal direction of said light guiding light source, said three LEDs emitting light of R, G and B respectively and said light guiding light source including a reflection unit adapted to reflect guided light into a predetermined direction;
(b) a sensor IC including a photoelectric conversion element for converting optical information from said object illuminated by said light guiding light source into an image signal;
(c) a sensor board mounted with a plurality of said sensor ICs arranged in a line and provided apart from said light guiding light source;
(d) a frame containing therein said light guiding light source and said sensor board, wherein said three LEDs arranged at the end portion of said light guiding light source have four lead members, and wherein said lead members and said sensor board are fixed by soldering said lead members to said sensor board at an end portion of said sensor board and a part of said frame is sandwiched by said sensor board and a part of said light guide; and
(e) a driving unit adapted to drive said light source to turn on.

160. A system according to claim 159, wherein said four lead members are arranged substantially in parallel to each other.

161. A system according to claim 159, wherein said four lead members include a common cathode and three anodes.

162. A system according to claim 159, wherein said light guiding light source is passivated with light transmittable resin.

163. A system according to claim 159, wherein said light guiding light source includes a white resin.

164. A system according to claim 159, wherein said light guiding light source is covered by a housing of white color, said housing including an opening to illuminate said object.

165. A system according to claim 159, wherein said lead members are soldered to a surface of said sensor board other than a surface of said sensor board on which said sensor IC is mounted.

166. A system according to claim 159, further comprising a lens array for forming an optical image of said object onto said sensor IC.

167. A system according to claim 159, wherein said LEDs and said lead members are electrically connected by a wire.

168. An image sensor comprising:
a sensor IC including a plurality of photoelectric conversion elements which are arranged in a line;
a sensor board mounted with said sensor IC;
a lens adapted to focus optical information on to said sensor IC;
an illumination device including a light source having an electrical connection wire member, and a light guide to which said light source is fixed, adapted to guide light from said light source to irradiate the guided light in a line shape along the arrangement of said plurality of photoelectric conversion elements; and
a frame adapted to hold said sensor IC, said sensor board, said lens and said illumination device,
wherein said image sensor is arranged in such a manner that said illumination device is pressed and fixed on a predetermined surface portion of said frame and then said electrical connection wire member of said light source is soldered directly to said sensor board with a portion of said frame being sandwiched by a base surface of said illumination device, which faces said sensor board, and a surface of said sensor board, which faces said illumination device, thereby fixing said sensor board to said frame and electrically connecting said electrical connection wire means of said light source and a circuit arranged on said sensor board.

169. An image sensor according to claim 168, wherein said electrical connection wire member is connected to said sensor board with being bended into a convex shape.

170. An image sensor according to claim 169, wherein said light source are arranged both end portions of said sensor board, and wherein said electrical connection wire member is bended into the convex shape which has a vertex of a right angle so that said sensor board is fixed to said frame by the convex portion of the bended wire member.

171. An image sensor according to claim 168, wherein said electrical connection wire member is bended in a similar shape of a character L, thereby connecting the wire member to an end portion of said sensor board.

172. An image sensor according to claim 168, wherein an electrode is arranged on an end surface of said sensor board, thereby connecting said sensor board and said electrical connection wire member of said light source.

173. An image sensor according to claim 168, wherein said sensor board has a notch or a through-hole and wherein said electrical connection wire member is inserted into the notch or the through-hole to be soldered to said sensor board.

174. An image sensor according to claim 168, wherein said light source includes a LED and a light source holding member adapted to hold the LED, said image sensor further comprising positioning means for positioning said light source holding member to an end portion of said light guide, wherein said light guide and said light source are fixed with said light source holding member being positioned to the end portion of said light guide.

175. An image sensor according to claim 174, wherein said electrical connection wire member of said light source is soldered directly to a soldering land of said sensor board, thereby sandwiching the portion of said frame by the base surface of said light guide and said sensor board.

176. An image sensor according to claim 168, wherein said light source includes a plurality of light emitting elements which emit lights of different wavelengths respectively, and four electrical connection wires which are connected to said plurality of light emitting elements, and wherein said four electrical connection wires are all soldered directly to a soldering land of said sensor board, thereby fixing said light source to said sensor board.

177. An image sensor comprising:
- a line-shaped illumination device adapted to illuminate an object in a line shape;
- a sensor IC including a photoelectric conversion element adapted to convert light information from said object illuminated in the line shape by said line-shaped illumination device into an image signal;
- a sensor board mounted with said sensor IC and disposed apart from said line-shaped illumination device; and
- a frame adapted to position and fix said line-shaped illumination device thereinto,
- wherein a lead member of a light source of said line-shaped illumination device positioned and fixed to said frame is soldered to said sensor board, thereby fixing said sensor board to said frame with a portion of said frame being sandwiched by a base surface of said line-shaped illumination device and said sensor board, and electrically connecting an electrical connection wire member of said line-shaped illumination device and a circuit arranged on said sensor board.

178. An image sensor according to claim 177, wherein the lead member is soldered directly to a soldering land said sensor board.

179. An image sensor according to claim 177, wherein said sensor board has a notch or a through-hole into which the lead member can be inserted, and the lead member is soldered to a soldering land of said sensor board with the lead member being inserted into the notch or the through-hole.

180. An image sensor according to claim 177, wherein said line-shaped illumination device includes a plurality of light emitting elements which emit lights of different wavelengths respectively, and four electrical connection wires which are connected to said plurality of light emitting elements, and wherein the four electrical connection wires are all soldered directly to a soldering land of said sensor board, thereby fixing said line-shaped illumination device to said sensor board.

181. An image sensor according to claim 177, further comprising a lens adapted to focus the light information from the object illuminated by said line-shaped illumination device onto said sensor IC.

182. An image sensor according to claim 177, wherein said line-shaped illumination device includes light guide means for guiding light from a light source to illuminate the object on the line shape.

183. An image sensor according to claim 182, wherein said line-shaped illumination device includes reflection means for irradiating the light guided by said light guide means into a predetermined line direction.

184. An image sensor according to claim 177, wherein said line-shaped illumination device is positioned by pressing said line-shaped illumination device on a predetermined horizontal surface and a predetermined vertical surface of an inner surface of said frame, and wherein a base surface of said line-shaped illumination device is parallel with said predetermined horizontal surface of said frame.

* * * * *

UNITED STATES PATENT AND TRADEMARK OFFICE
CERTIFICATE OF CORRECTION

PATENT NO.    : 6,326,602 B1
DATED         : December 4, 2001
INVENTOR(S)   : Masami Tabata It is certified that error appears in the above-identified patent and that said Letters Patent is hereby corrected as shown below:

Column 6,
Line 58, "Asystem" should read -- A system --.

Column 7,
Line 26, "board;" should read -- board; and --.

Column 10,
Column 36, "claim 84," should read -- claim 92, --.

Column 12,
Line 61, "claim 133," should read -- 139, --.

Column 14,
Line 26, "on to" should read -- onto --; and
Line 53, "are arranged" should read -- is arranged at --.

Column 16,
Line 5, "land" should read -- land of --.

Signed and Sealed this

Eighth Day of October, 2002

Attest:

JAMES E. ROGAN
Attesting Officer          Director of the United States Patent and Trademark Office